United States Patent
BarBaruolo

(10) Patent No.: US 7,097,158 B2
(45) Date of Patent: Aug. 29, 2006

(54) LIFT MECHANISM FOR FIFTH WHEEL TRAILER TUBE AND FOOT PAD

(76) Inventor: Rocco BarBaruolo, 444 E. Ave. J-7, Lancaster, CA (US) 93535

(*) Notice: Subject to any disclaimer, the term of this patent is extended or adjusted under 35 U.S.C. 154(b) by 189 days.

(21) Appl. No.: 10/846,855

(22) Filed: May 17, 2004

(65) Prior Publication Data
US 2005/0253126 A1 Nov. 17, 2005

(51) Int. Cl.
*B60S 9/02* (2006.01)
(52) U.S. Cl. .............. 254/419; 280/766.1; 254/420
(58) Field of Classification Search ............. 254/419, 254/418, 420, 426; 248/359.5, 352; 280/763.1, 280/766.1
See application file for complete search history.

(56) References Cited

U.S. PATENT DOCUMENTS 2,240,430 A * 4/1941 Willard ................ 254/422
3,768,088 A * 10/1973 Risius ................. 340/431
2002/0060442 A1 * 5/2002 Anderson et al. ........ 280/416.1

* cited by examiner

Primary Examiner—Robert C. Watson
(74) Attorney, Agent, or Firm—Mark Levy & Associates, PLLC

(57) ABSTRACT

A lift mechanism for a fifth wheel trailer tube and foot pad that is both functional and accessible. A tee handle is made with curved ends and a smooth finish, making it comfortable to grip when lowering or raising the foot pad assembly. A telescoping tube is hollow, allowing a cable to be guided through it and around a pully to an eye bolt that is attached to the foot pad. A cover is provided over the pully to keep the cable securly in the pully groove and direct it to the foot pad using the slotted cutouts in the cover. A main "L" shaped bracket allows the telescoping tube to be mounted at an angle, making it easier for operator reach.

3 Claims, 4 Drawing Sheets

LIFT MECHANISM FOR FIFTH WHEEL TRAILER TUBE AND FOOT PAD

FIELD OF THE INVENTION

This invention relates to the fifth wheel trailers and, more particularly, to an easily operable lift for lowering and raising the tube and foot pad assembly on a fifth wheel trailer

BACKGROUND OF THE INVENTION

Since fifth wheel trailers have been in use, the procedure for lifting and lowering a trailer from a tow vehicle has been done by using the front jacks on the trailer. A jack assembly consists of a stationary housing, an electrically operated ram tube and the adjustable tube and foot pad assembly. Prior to using the electric jack motor to raise the trailer off of the tow vehicle, the tube and foot pad assembly located on the front jacks have to be unlocked and lowered to the ground by hand and locked in the down position. To accomplish this, the operator must get under the fifth wheel trailer overhang first to get between the tow vehicle and trailer's front jacks, then the operator must bend down and get on his/her knees to reach the tube and foot pad assembly. The operator can then unlock and lower the assembly to the ground by hand, finally, the operator locks the assembly in the down position. Since there are two sets of tube and foot pad assemblies located on the front jacks, this procedure has to be performed twice before raising the trailer.

When this procedure is completed, the 5th wheel trailer can then be electrically raised to uncouple it from the tow vehicle. This same procedure has to be repeated when lowering the trailer to couple it with the tow vehicle, only in reverse. The trailer is electrically lowered onto the tow vehicle until the weight of the trailer rests on the tow vehicle. Now the operator again has to bend down, get on his/her knees and unlock the tube and foot pad assemblies, then raise them by hand and lock them in the up position. What makes this operation more uncomfortable and less safe is having to do this when mud or puddles of water are under the fifth wheel trailer in which the operator must kneel.

At the present time there are no other solutions in existence to address this problem.

It is therefore an object of the invention to allow the operator of a fifth wheel trailer to lower and raise the trailer tube and foot pad assembly with ease, safety and comfort.

It is another object of the invention to prevent the operator of a fifth wheel trailer from getting wet and dirty while lowering or raising the tube and foot pad assembly.

It is another object of the invention to allow elderly and less agile men and women to accomplish the task of lowering and raising the tube and foot pad assembly with ease and comfort.

SUMMARY OF THE INVENTION

In accordance with the present invention, there is provided a mechanism for an operator of a fifth wheel trailer to raise and lower both tube and foot pad assemblies with ease and comfort. The invention features an "L" shaped bracket and backing plate with the following elements mounted to it: a) tee handle, b) cable, c) hollow telescoping tube, d) pully, e) pully cover and f) clamp. The tee handle has both the cable and telescoping tube attached to it, making it a single operational element. The cable is threaded through the telescoping tube and enters the top slot of the pully cover. The cable is directed onto groove of the pully and exits the bottom slot of the pully cover. The cable continues to the eye bolt that is attached to the foot pad. The operator can easily reach the tee handle due to its location on the trailer's front jacks.

To lower a tube and foot pad assembly, the operator removes the locking pin to allow the tube and foot pad assembly to contact the ground. The operator then pulls up slightly on the tee handle until locking pin holes align, locking the tube and foot pad assembly in the down position, with the lock pin.

To raise the tube and foot pad assembly, the operator simply removes the lock pin, pulls on the tee handle and easily raises the tube and foot pad assembly, locking it in the up position with the lock pin. Neither of these procedures requires the operator to work under the fifth wheel trailer.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
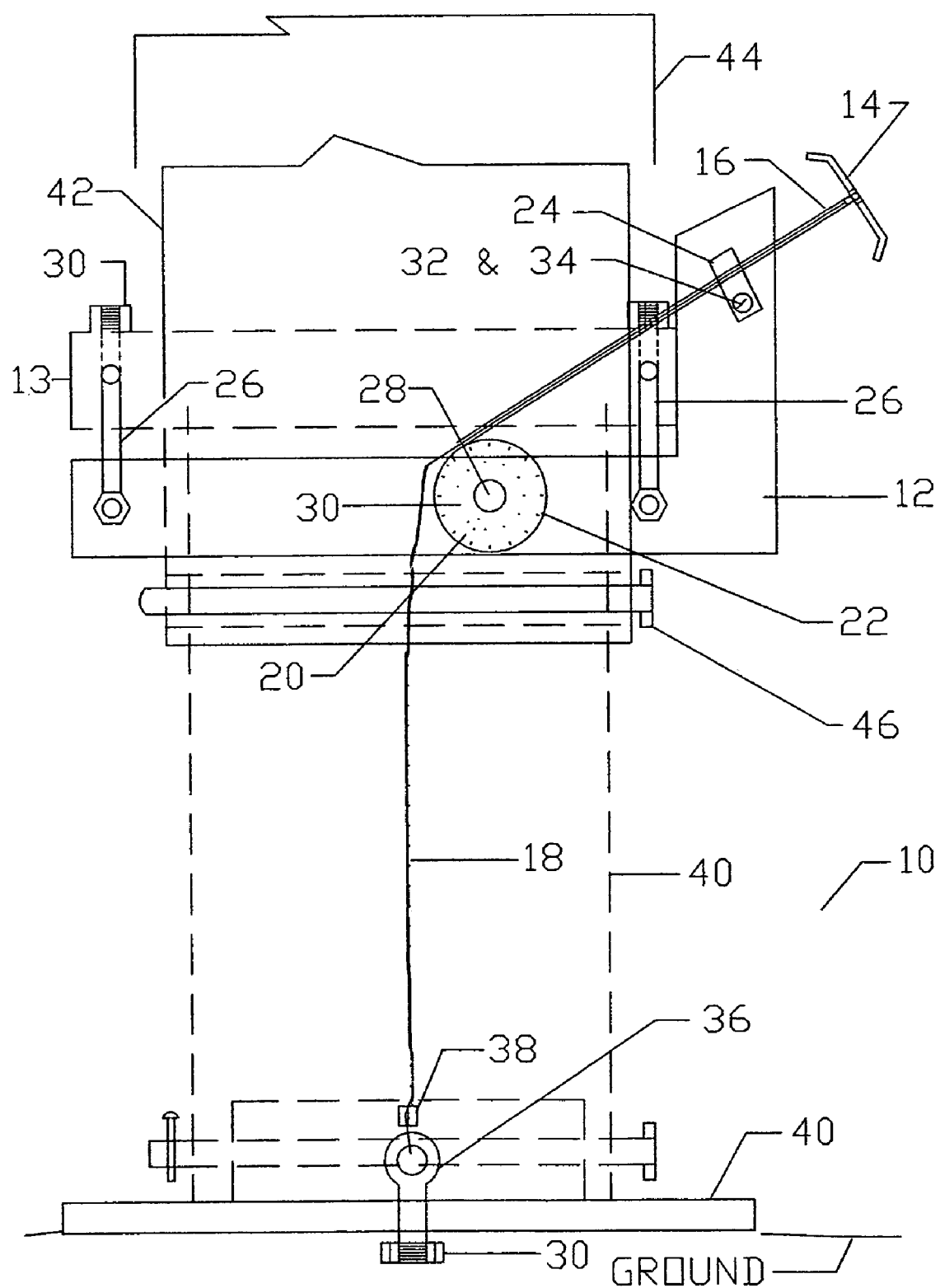
FIG. 1 is a front view of a fifth wheel trailer tube and foot pad lift mechanism in accordance with the invention, showing the tube and foot pad extended and locked and the telescoping tube collapsed.

FIG. 1 is a front view of a fifth wheel trailer tube and foot pad 40 lift mechanism in accordance with the invention consisting of the following elements.

An L shape main bracket, tee handle 14, hollow telescoping tube 16, cable 18, pully 20, cover 22, rubber coated clamp 24 and eye bolt 36. The cable 18 runs through the telescoping tube 16 and is connected to the tube at the narrow end and then connected to the tee handle 14. The clamp 24 holds the telescoping tube 16 to the L shape bracket. At the opposite end of the telescoping tube 16, the cable 18 enters the cover 22 and rotates on the pully 20. A cover 22 is provided to keep the cable 18 in the pully 20 groove and direct it to the eye bolt 36 located on the tube and foot pad 40, at this point the cable 18 is attached to the eye bolt 36.

This figure shows the L shape main bracket with elements of the tube and foot pad 40 lift mechanism mounted to it. The L shape main bracket is attached to the ram tube of a fifth wheel trailer frame using the backing plate 13, two bolts 26, and two nuts 30.

A tube and foot pad 40 is shown fully extended. A telescoping tube 16 fully collapsed, is connected to a tee handle 14 and a cable 18. The aforementioned components are shown in greater detail in FIG. 3.

Figure 4:
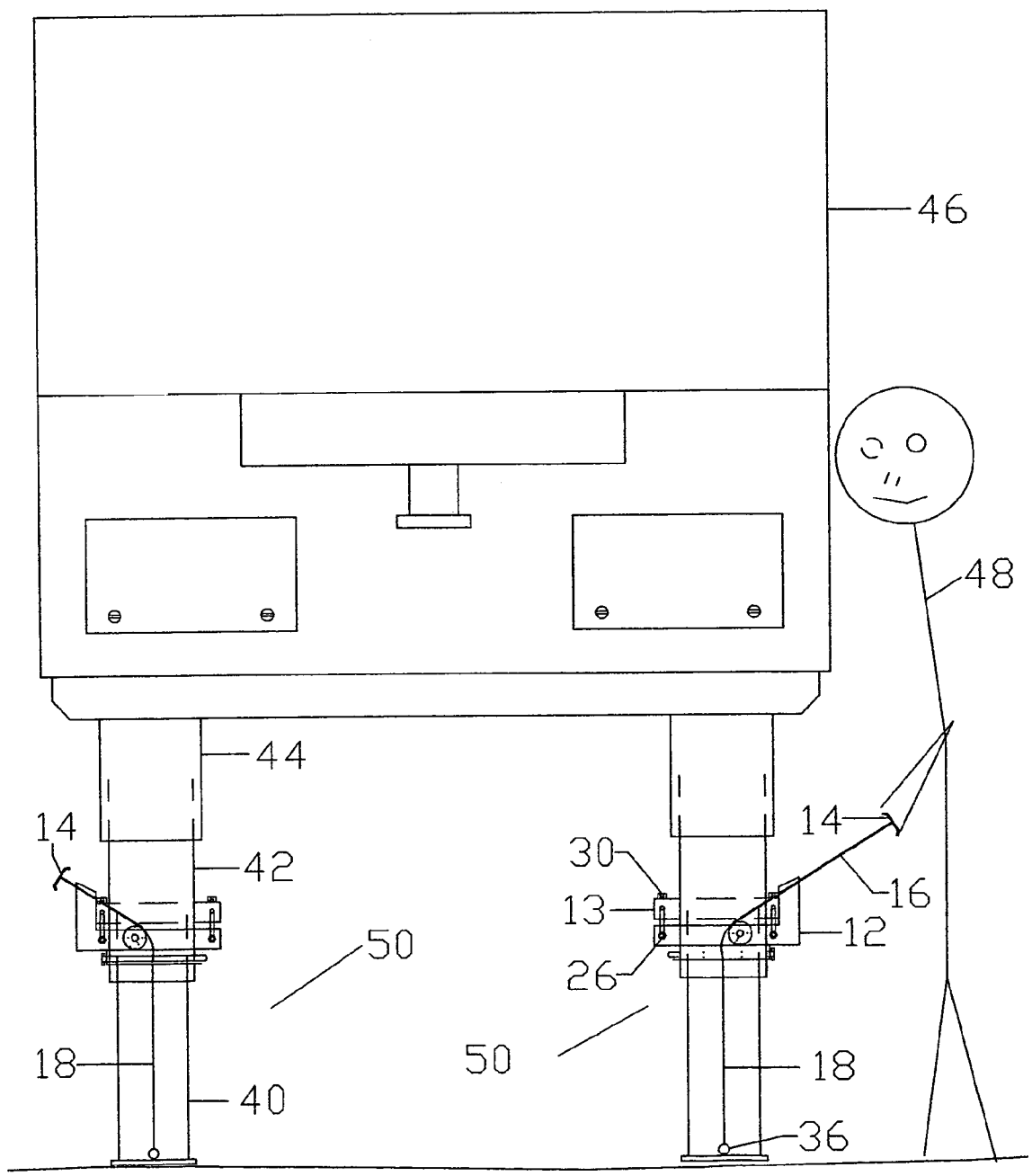
FIG. 4 is a schematic view of a the fifth wheel trailer tube and foot pad lift mechanism as shown in FIG. 1, with an operator thereof.

The ram tube 42 and tube and foot pad 40 are part of the trailer's front jacks 50 (FIG. 4). The ram tube 42 is the electrically operated part of the trailer jacks 50, which slide up and down inside the stationary housing 44, which raises and lowers the trailer 46.

Figure 2:
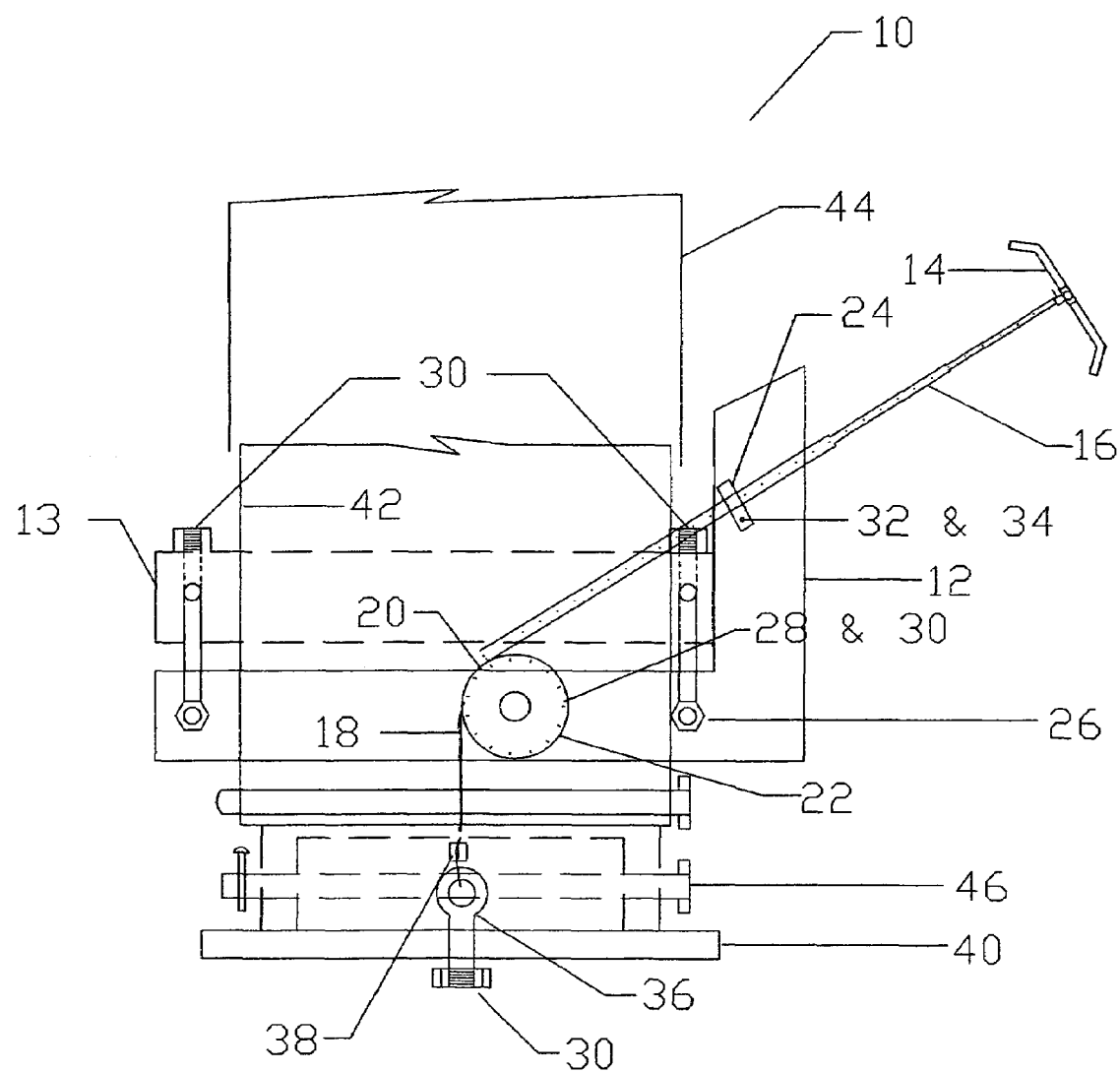
FIG. 2 is a front view of a the fifth wheel trailer tube and foot pad lift mechanism of FIG. 1 showing the foot pad assembly retracted and locked with the telescoping tube extended.

When the tube and foot pad 40 lift mechanism is to be retracted, the tee handle 14 is pulled. It extends the telescoping tube 16 pulling the cable 18 that is attached to the tube and foot pad 40. This operation raises the tube and foot pad 40 to the retracted position, as shown in FIG. 2, and then the tube and foot pad 40 is locked in place with locking pin 46. The cable 18 connected to the handle 14 runs through the telescoping tube 16 and enters one of the slots on the cover 22. Once inside the cover 22, cable 18 enters into the groove of pully 20 and exits the other slot of the cover 22 at a 45 degree angle, directing the cable 18 to the tube and foot pad 40. At the tube and foot pad 40 an eye bolt 36 is attached with a threaded nut 30. The cable 18 is routed through the eye bolt 36 and is secured to itself using a crimp sleeve 38 or other suitable securing implement.

FIG. 2 is another front view of the fifth wheel trailer tube and foot pad 40 lift mechanism. The tube and foot pad 40 is fully retracted and the telescoping tube 16, is fully extended. The telescoping tube 16 is to be collapsed for storage upon completion of the tube and foot pad 40 retraction operation, as shown in FIG. 1.

Figure 3:
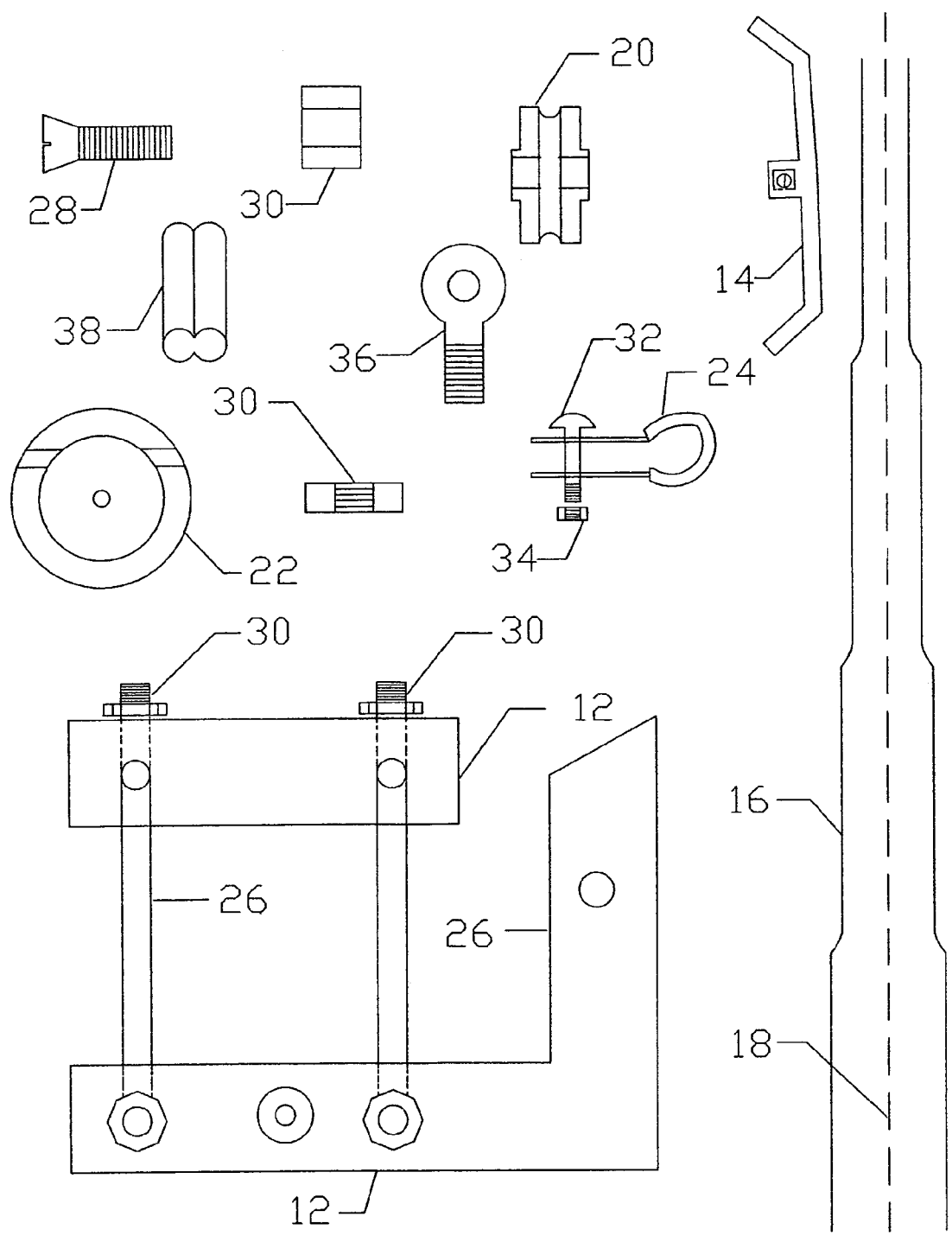
FIG. 3 is an enlarged view of an of the individual elements and subassemblies of the lift mechanism.

FIG. 3 is an enlarged view of the individual elements and subassembilies of the lift mechanism.

FIG. 4 is a schematic view of the fifth wheel trailer tube and foot pad 40 lift mechanism and an operator 48 proximate the tee handle 14. The L shape main bracket 12, tee handle 14, telescoping tube 16, pully 20 and cover 22, are the main elements that makes for the ease in operating the tube and foot pad 40 lift mechanism 10.

A lift mechanism for a fifth wheel trailer tube and foot pad 40 that is both functional and accessible. A tee handle 14 is made with curved ends and a smooth finish, making it comfortable to grip when lowering or raising the foot pad assembly. A telescoping tube 16 is hollow, allowing a cable 18 to be guided through it and around a pully 20 to an eye bolt 36 that is attached to the foot pad. A cover 22 is provided over the pully 20 to keep the cable 18 securly in the pully 20 groove and direct it to the foot pad using the slotted cutouts in the cover 22. A L shaped main bracket, allows the telescoping tube 16 to be mounted at angle, making it easier for operator reach.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A lift mechanism for a fifth wheel trailer, comprising:
   a tube and foot pad assembly;
   an L-shaped main bracket;
   an oblong backing plate, for mounting the main bracket;
   a handle, for the operator to pull to raise the tube and foot pad assembly;
   a tube, for enclosing a cable and having both the handle and cable attached to it, rigidly connected to said handle, and rigidly connected to said main bracket;
   a cable, for connecting the handle to the tube and foot pad assembly, rigidly connected to said handle;
   a grooved pulley, for rotating the cable, rigidly connected to said main bracket;
   a cable entry and exit cover, for covering and keeping the cable in the pulley groove, rigidly connected to said main bracket; and
   an eye bolt, for connecting the cable to the tube and foot pad assembly, rigidly connected to said cable.

2. The lift mechanism for a fifth wheel trailer as recited in claim 1, wherein said tube comprises a telescoping tube and, further comprising:
   a clamp, for holding the telescoping tube on the main bracket, rigidly connected to said telescoping tube.

3. The lift mechanism for a fifth wheel trailer comprising:
   an L-shaped main bracket, for holding all the elements of the mechanism;
   an oblong backing plate, for mounting the main bracket;
   a handle, for the operator to pull to raise the tube and foot pad assembly;
   a collapsible telescoping tube, for enclosing a cable and having both the handle and cable attached to it, rigidly connected to said handle, and rigidly connected to said main bracket;
   a cable, for connecting the handle to the tube and foot pad assembly, rigidly connected to said handle;
   a grooved pulley, for rotating the cable, rigidly connected to said main bracket;
   a cable entry and exit cover, for covering and keeping the cable in the pulley groove, rigidly connected to said main bracket;
   a clamp, for holding the telescoping tube on the main bracket, rigidly connected to said telescoping tube; and
   an eye bolt, for connecting the cable to the tube and foot pad assembly, rigidly connected to said cable.

* * * * *